June 12, 1951 — L. E. CROSS — 2,557,027
CONTROLLER FOR HEATING SYSTEMS
Filed Nov. 13, 1947 — 3 Sheets-Sheet 1

INVENTOR.
Lloyd E. Cross
BY Charles K. Woodin
Agent.

June 12, 1951

L. E. CROSS 2,557,027

CONTROLLER FOR HEATING SYSTEMS

Filed Nov. 13, 1947

INVENTOR.
Lloyd E. Cross
BY
Charles K Woodin
Agent.

Patented June 12, 1951

2,557,027

UNITED STATES PATENT OFFICE 2,557,027

CONTROLLER FOR HEATING SYSTEMS

Lloyd E. Cross, Milwaukee, Wis.

Application November 13, 1947, Serial No. 785,659

10 Claims. (Cl. 236—10)

This invention is directed to an automatic controller designed more specifically for use in connection with forced air heating systems and functioning in the capacity of keeping the output of the automatic heating appliances, such as oil burners, stokers, gas burners and other heating units in step with the requirements of the building being heated by such system, and to further maintain a supply duct temperature which will be in step with the needs of such building, such controller having a further inherent capacity of automatically compensating for fresh air of any temperature which is introduced into the system at intervals during the operation thereof.

From common knowledge and experience, it has been concluded that the most desirable situation is to have a heating system capable of delivering a constant flow of heated air into the space or spaces to be heated thus creating an ideal condition as judged from the standpoint of comfort. Heretofore, two general conventional methods have been employed for attempting to simulate this ideal arrangement for delivering a constant flow of heated air, and such two methods relate to incorporating regulating mixing dampers or in using automatic volume control dampers (zone dampers). The past practice has proven that most of the foregoing methods require considerable equipment and expense, and for the regulation of either of the two systems it is necessary to provide a control that will keep the discharge temperature in step with the requirements of the heated spaces. In many heating systems an attempt has been made to solve such regulation by using a room thermostat operating in conjunction with an outside thermostat as a means for control, but this method has proven comparatively expensive and among other disadvantages such a control means has been found difficult to adjust for the purposes of suiting the characteristics of each individual building and also in conforming with the characteristics of the heating plant of which the regulation is being attempted.

A further method that has been used in the past is to cause a readjustment of the warm air plenum controller through the use of a room thermostat or by an outdoor thermostat, or by a suitable arrangement incorporating the combination of both thermostats. This method, however, adjusts the plenum temperature in more or less fixed increments and has proven through experience to be uncertain as a regulatory means due to the tendency of such a system to hunt and cycle.

One of the main objects of the present invention is to provide a controller having simple and positive connections with the heating system and which will overcome all of the undesirable features of the two main systems above noted and which will have all of the advantages of automatically controlling the temperature of the heated air delivered from automatic heating appliances to maintain a constant flow of heated air into the space which is being heated, and the temperatures of which air is supplied directly in accordance with the demand created by the rise or fall of the outside temperature.

To amplify the main object of the controller of the present invention, this controller automatically functions to vary the plenum temperature according to and directly in step with the requirements of the space or spaces being heated, through the regulation of the heat source of the particular appliance being used for heating the air by turning such heat source on or off, or by modulating the same as required. The controller automatically takes into account the rise or fall of the room or spaces temperature, and a rise or fall in the plenum temperature, and further operates to compensate and constantly maintain a balanced condition in such heating system.

The controller of this invention incorporates various other features and advantages which all coact to contribute to the optimum design and operation of such a controller thereby providing a means of simple and inexpensive construction which will regulate a heating system to automatically produce a constant flow of heated air into the space or spaces being heated.

All other advantages as well as further objects and features relating to the present design of controller shall hereinafter appear in the following detailed description having reference to the accompanying drawings disclosing preferred and modified constructions of the controller and forming a part of this specification.

Figure 3:
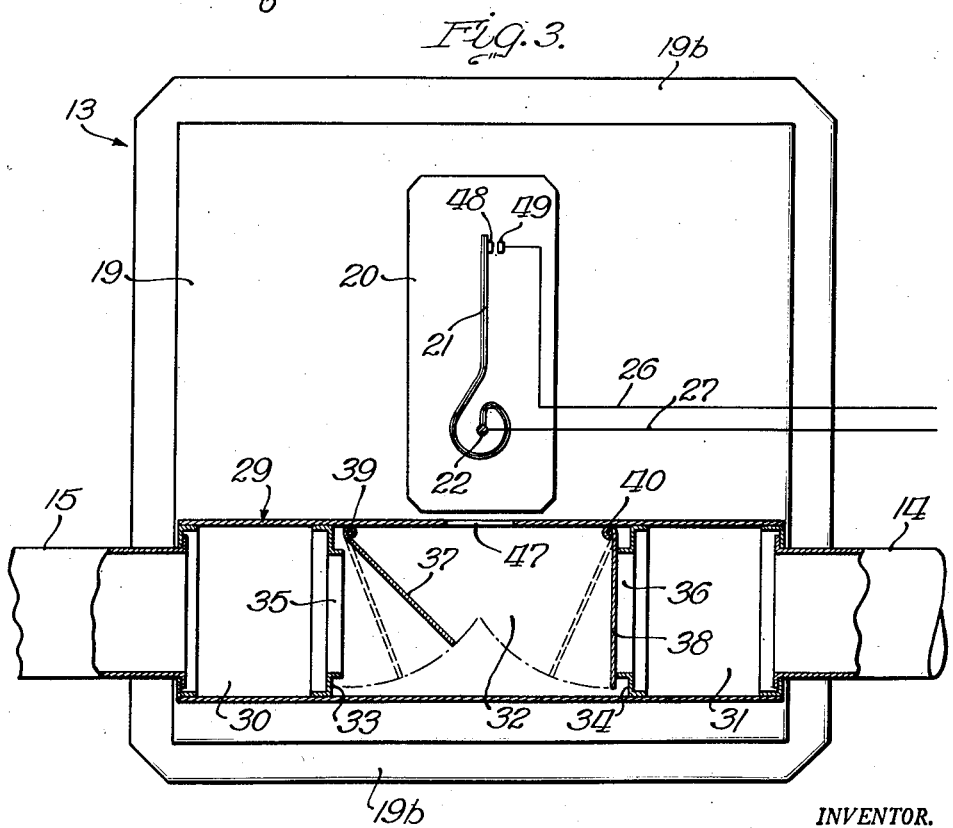
Figure 2:
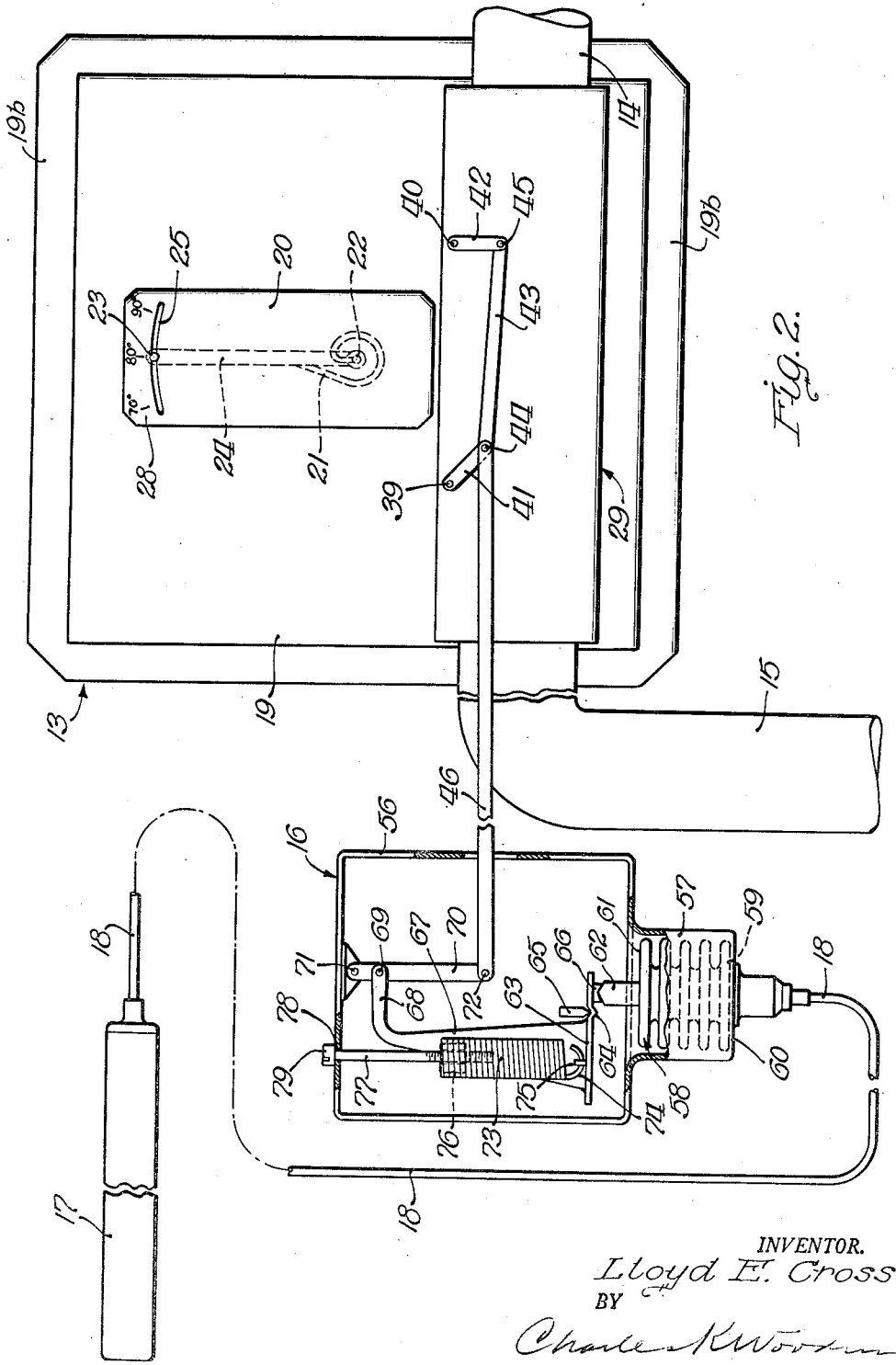
Fig. 2 is an enlarged side elevational view of the controller together with the thermal bulb and the actuating mechanism used for operating the controller through means directly responsive to the operation of such thermal bulb.
Figure 4:
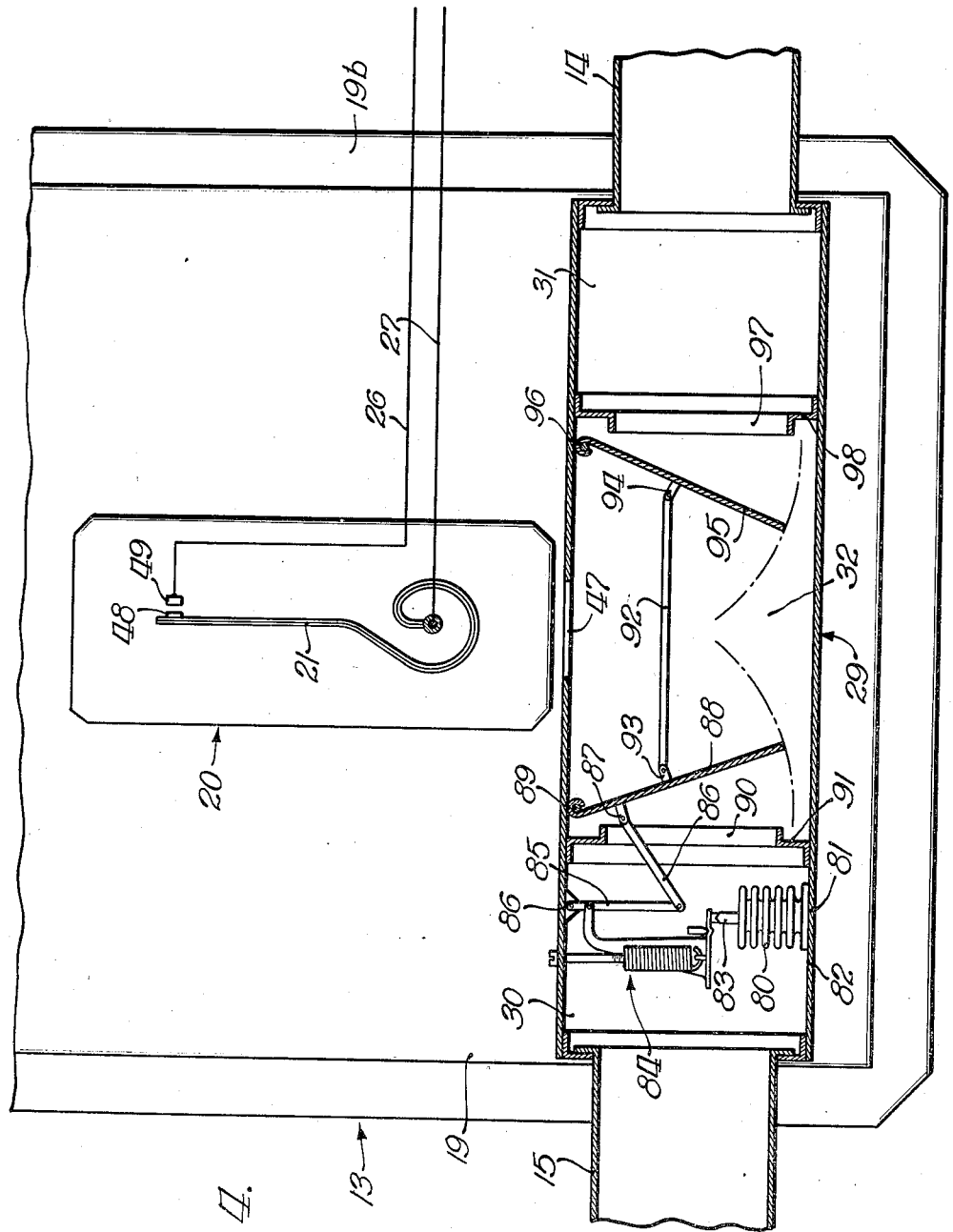

Fig. 3 represents another view of the controller corresponding to the Fig. 2 illustration but with certain parts broken away and in section to emphasize other details of construction thereof; and Fig. 4 is another view of a modified construction of controller for regulating the operation of a heating plant or system, such controller also being shown with certain parts thereof illustrated in section to clarify and better present the working details thereof.

Figure 1:
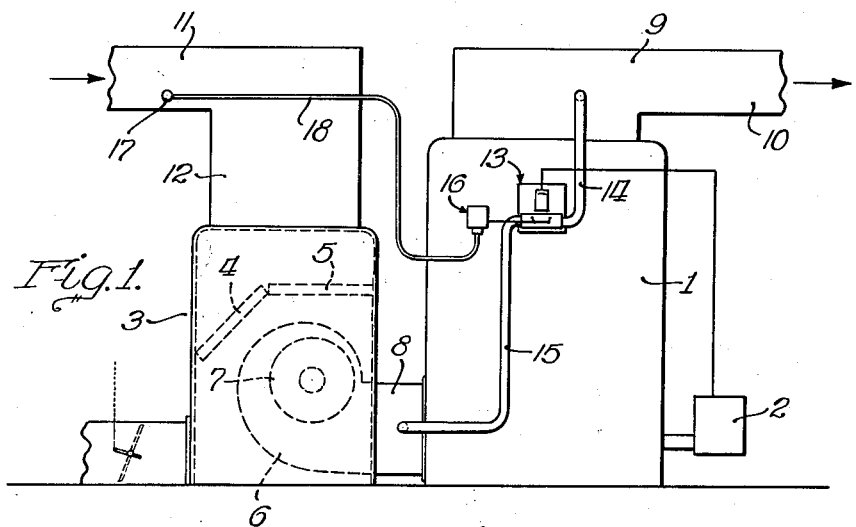
Fig. 1 is a general diagrammatic side elevational view of a conventional heating plant having the control device of this invention associated therewith, and further illustrating a typical arrangement through which the operation of the heating plant is regulated by means of the controller.

In Fig. 1 is illustrated a conventional form of heating unit interposed in a heating system and constituting an automatic heating appliance which functions to introduce the necessary amount of heat into the duct system for the purpose of maintaining the space or spaces of a building heated to a predetermined and selected temperature as required by the demands of the space or spaces depending upon conditions of use. The heating plant in Fig. 1 comprises a heater 1 having a conventional heat exchange interior of any conventional type and with heat being supplied to the heater 1 by means of an oil burner 2. The movement of air through the entire heating system encompassing all of the ducts and the heater per se is brought about by means of the pressure unit 3 having an interior chamber for suitably supporting air filters 4 and 5 so that the return air from the building and its plurality of spaces is filtered thereby for entrance into another portion of the pressure unit housing confining the blower 6 which may be driven in any desirable manner. Blower 6 has the usual side intake opening 7 which draws the return air through the filters 4 and 5 and discharges the same through a lateral discharge duct 8 which empties directly into the heat exchange portion of the heater 1 from which such air discharges upwardly into the warm air discharge chamber 9 from which the warm air passes through one or more ducts 10 for transmission to the space or spaces of the building being heated. The air from the space or spaces is returned through one or more ducts 11 which communicate with the return air chamber 12 that empties into the pressure unit 3 and the latter with the blower in constant operation when on, functions to keep the air flow in motion through the heater 1 whenever heating is required. Pressure unit 3 or blower 6 are provided with the usual form of fresh air damper controlled intake common in installations of this kind. Also, the blower will be operating and constantly recirculating the air in the duct system as long as the manual switch in the blower circuit is on.

The controller is indicated in its entirety at 13 and may be mounted in any convenient relation with respect to the heater which will permit the best installation and arrangement of suitable controller tubes 14 and 15 which are connected to the warm air discharge chamber 9 and the blower discharge duct 8 which respectively bleed samples of air from the aforementioned air zones to carry out the functions of the controller 13. Tubes 14 and 15 may be well covered with heat insulation if desirable to prevent heat transmission.

A regulating mechanism 16 is mounted in convenient relation with respect to the controller 13 for the purpose of operating the moving parts thereof and such regulating mechanism is actuated by means of a suitable thermal bulb 17 located in the return air duct 11 ahead of the blower 6 and communicating by means of a tube 18 with the regulating mechanism 16.

It should be understood that although 13 is described as comprising the controller, that the regulating mechanism 16 together with the thermal bulb 17 and tube 18 as well as the operative connections between the regulator 16 and controller 13 all constitute the controller or controlling mechanism of the present invention. In other words, referring to Fig. 2, this entire arrangement together with the bleed tubes 14 and 15 constitute the composite mechanism which carries out the duty of piloting the heating device for the purpose of obtaining the constant flow of heated air into the space or spaces which are being heated to promote the optimum comfort of the occupants or to promote the most efficient heating operation of any particular space being maintained at a predetermined heat commensurate with the conditions of use of such space.

Referring now more particularly to Fig. 2, the controller 13 comprises a support or panel 19 which suitably carries a thermostat 20. The thermostat 20 is of the type having the usual bi-metallic contact element 21 rockably mounted at 22 for angular adjustment by means of a pin 23 connected with an arm 24 which changes the angular position of the rockable connection 22 when the pin 23 is moved along the arcuate slot 25 into any one of a number of positions which may be selected for causing the thermostat to close a circuit through the wires 26 and 27 illustrated in Fig. 3. Suitable temperature reference indicia 28 may be inscribed or printed upon the face plate of the thermostat 20 in which the slot 25 is located so as to guide the person making the regulations in selecting the proper position of the arm 24 of the thermostat 20.

A manifold 29 is mounted below thermostat 20 upon panel 19 of the controller 13 and extends across the bottom portion thereof adjacent the thermostat 20, with the ducts 14 and 15 communicating with the opposite ends of such manifold. As best seen in Fig. 3, this manifold 29 is divided into three zones comprising the blower cool air inlet chamber 30, the warm air inlet chamber 31 and a common and central mixing chamber 32 interposed between the chambers 30 and 31. The mixing chamber 32 is flanked by the annular baffles 33 and 34 having discharge openings 35 and 36 respectively each having areas equivalent to the areas of the bleed tubes 14 and 15 to prevent any restriction of the normal flow of air through each of these tubes when such air passes into the mixing chamber 32.

Each of the openings 35 and 36 are provided with valve means such as dampers 37 and 38 secured to operating pins or shafts 39 and 40 respectively. These pins 39 and 40 extend transversely of the manifold 29 and project outwardly therefrom. As shown in Fig. 2, arms 41 and 42 are secured to similar adjacent ends of the pins 39 and 40 for rocking directly therewith and to cause angular adjustment of the dampers 37 and 38 according to the angular movements of the arms 41 and 42. As further seen in Fig. 2, arms 41 and 42 are connected by means of a common link 43 extending between the pivot pins 44 and 45 while an operating link 46 is pivotally connected with the pin 44 to regulate the movements of the arms 41 and 42 and their connected dampers 37 and 38 according to the thermal responsive means in the return duct connected with the regulator 16.

Before explaining the mechanism and operation of the regulator 16, attention is directed to Fig. 3 wherein the manifold 29 in addition to the parts already described is also provided with an orifice or port 47 which is located centrally of the mixing chamber 32 and provides a vent through which any air that is mixed in the chamber 32 is expelled under the pressure of the introduced air of either or both of the bleed tubes 14 and 15. The orifice or port 47 is so positioned as to direct an air stream from the manifold 29 and out of the mixing chamber 32 thereof and in the direction of the thermostat 20 to flow over the bi-metallic unit 21 thereof sensitizing such bi-metallic unit to cause the latter to move in one direction or the other for making or breaking the contacts 48 and 49 which control to complete or break the electrical circuit carried over the wires 26 and 27 which continue on and connect with the operating mechanism or motor of the burner 2 illustrated in Fig. 1.

The regulator 16 as best illustrated in Fig. 2 comprises a housing 56 for confining the operating mechanism thereof, and this housing has a depending cup 57 connected therewith for housing the Sylphon bellows 58 which has its lower end 59 secured to the bottom wall 60 of the cup 57 and has its free upper end 61 guided for movement within the cup 57 and provided with an actuating stud 62. Any expansion or contraction of the Sylphon bellows 58 as controlled by the thermal bulb 17 through the connecting tube 18 which connects with the interior of the bellows 58 will cause the stud 62 to move vertically upwardly or downwardly within the chamber of the housing 56 of the regulator 16.

Suitable operating mechanism is interposed between the stud 62 and the operating or actuating link 46 of the controller so that the movements of the stud 62 are directly transmitted to such link 46 for regulating the positions of the dampers 37 and 38 in the manifold 29. This operating mechanism comprises a plate 63 having a suitable groove 64 for coacting with the fixed fulcrum 65 secured to the casing 56, such plate 63 also having a suitably arranged and shaped pad 66 adapted for direct coaction with the stud 62 of the Sylphon bellows 58. In addition, the plate 63 has an upstanding arm 67 terminating in a lateral or horizontal leg 68 which is pivotally connected at 69 to the intermediate portion of the link 70 which swings about a fixed pivot 71 carried by the casing 56, and such link 70 also has pivotal connection at 72 with the outer end of the actuating link 46 which operates the dampers 37 and 38.

Adjustable means has been introduced for regulating the tension or pressure required by the Sylphon bellows 58 to produce proper and automatic operation of the dampers in accordance with the heating characterictics of the building and also of the heating plant being controlled by this novel controller arrangement. A preferred adjustable arrangement may be employed which comprises a spring 73 having one end 74 connected with an ear 75 attached to the plate 63. The other end of the spring is suitably formed to encircle an enlarged nut 76 threaded upon the bolt 77 depending through an opening 78 in the housing 56 and which bolt has its head 79 disposed in abutting engagement with the upper surfaces of the top portion of the casing or housing 56. By using a screw driver or other suitable tool, to rotate the head 79 it is possible to move the nut 76 vertically up or down to cause distention or contraction of the spring 73 thereby increasing or decreasing the tension at the point of connection of the spring with the ear 75 increasing or decreasing the pressure of the pad 66 against the stud 62 through this particular manual regulation. By the proper arrangement as well as the proper selection of the size and shape of the parts in the regulator 16 it is possible to obtain the most desirable movements required as induced by the Sylphon bellows 58 to operate the dampers 37 and 38 in the manifold mixing chamber 32 to automatically control the ratio of mixing of the air in such chamber and the discharge of such air through the orifice or port 47 of the manifold 29 against the bi-metallic unit 21 of the thermostat 20.

A modified arrangement of controller is illustrated in Fig. 4 wherein the damper regulating mechanism has been directly incorporated into the manifold 29 and in one of the chambers thereof. This arrangement contemplates housing the damper regulating mechanism within the chamber 30 of the manifold 29 and includes a self contained Sylphon bellows 80 having its bottom end 81 closed and suitably secured to the bottom wall 82 of the manifold 29. Such Sylphon bellows 80 is provided with a movable stud 83 which operates through an adjustable link mechanism 84 to swing the arm 85 about its supporting pivot pin 86 carried in fixed relation with respect to the manifold 29. Arm 85 is connected by link 86 with an ear 87 secured to a damper 88 pivotally supported at 89 and adapted for regulating the air flow through the opening 90 in the divider or baffle unit 91. A tie link 92 is pivotally connected with the ears 93 and 94 connected respectively to the damper 88 and damper 95, the latter being pivotally carried at 96 and functioning to regulate the air flow through the opening 97 in the divider or annular baffle 98 positioned as shown in Fig. 4. The Sylphon bellows 80 is actuated to expand or contract according to the temperature of the return air flowing into manifold 29 through the return tube 15. Expansion of the Sylphon bellows 80 as directly caused by an over temperature condition in the return air flow will operate the mechanism 84 to draw the arm 85 to the left in Fig. 4 thereby closing damper 88 and opening the damper 95 to prevent the cooler air from the blower from entering the mixing chamber to such a proportion as to operate the thermostat 20. This condition will prevail until the Sylphon bellows 80 is made to respond to a cooler normal return of air to the blower so that the damper 88 will be opened while damper 95 closes, whether completely or otherwise, thus permitting cold or colder blower air to enter through the bleed tube 15 into the mixing chamber 32 comingling with air from tube 14 and then out of the orifice or port 47 to be directed against the thermal unit 21 of the thermostat 20. This will cause such unit to act in its designed capacity to close the contacts 48 and 49 completing the electrical circuit through the wires 26 and 27 causing such circuit to operate the power means for actuating the burner to introduce more heat into the heat exchange chamber of the heater 1 of the heating plant. The general arrangement and action of the Fig. 4 controller is the same as the arrangement and action of the controller utilized in Fig. 2 with the exception that the Fig. 4 arrangement comprises a generally self contained unit substantially confining all of the working parts within the main manifold of the controller which directs mixed air from such manifold upon an adjacently located control thermostat which automatically functions to turn the heating appliance on or off depending directly upon the demands of the heating system and the conditions under which such heating system is operated.

The general operation of the controller 13 and its associated mechanisms may be as follows. After the heating plant has been shut down and it is desirable to again start such plant for heating the space or spaces to which the same delivers forced warm air, it is the first step to turn on the blower when heating is required and the blower will then first circulate cold return air through the system. At the same time that the system is started and has been cold, the dampers 37 and 38 will be in the positions indicated in full lines in Fig. 3 so that the cold air entering the mixing chamber 32 will be forced out of the orifice or port 47 against the thermal element of the thermostat 20 which responds to this cold air flow causing an electrical contact to be established between the contacts 48 and 49 to transmit electrical energy to the power unit of the burner 2 which will then operate to introduce heat into the heater for raising the temperature of the air passing through such heater. The burner will continue to heat the heater space for transmission to the air which passes through such heater into the warm air duct leading to the room or building spaces until the building has become warm at which time the return air temperature will have reached a temperature critical enough to cause the thermal bulb 17 to operate the dampers 37 and 38, or small butterfly valves, to change the conditions within the mixing chamber 32. The dampers 37 and 38 will then move into some intermediate position substantially as indicated in broken lines in Fig. 3 changing the ratio of the air mixture. At this particular time some air will flow through the bleed tube 14 from the warm air plenum into the mixing chamber 32 to mix with air from tube 15 and then to pass through the port 47 against the control thermostat 20. This mixture is then considerably warmer in temperature and will operate the thermostat to interrupt the flow of current to the power means of the burner 2 shutting the later off. At this point the air system will be balanced and the blower will continue to circulate the air through the rooms.

The thermostat 20 is usually set to respond at a temperature of 75 degrees or slightly above the temperature to be maintained in the heated zone or space of the building.

If the temperature of the return air in duct 11 falls, the thermal bulb 17 will move the dampers back slightly toward their original full line positions and more cool air and less warm air will flow over the thermostat 20 so that the burner again starts and introduces heat into the heater for warming the air passing through the heater and entering the warm air ducts. Thereafter, when the heated space reaches the desired temperature, the movement of the dampers 37 and 38 will then be stabilized, and the burner will then only operate when there is a drop in the temperature of the warm air in chamber 9 as indicated by the temperature drop of the warm air being bled through tube 14 into the manifold 29 which will eventually turn on the burner 2 as the inertia temperature in the heater falls to a point below the required amount to hold the warm air to a temperature sufficient to supply the space heating demands. Obviously, the burner will also be started if there is a drop in the temperature of the air passing through the bleed tube 15 connecting with the blower duct 8 upon introduction of outside air directly into such blower system to replenish or freshen the normal volume of air passing through the heating system.

It should also be noted that this instrument is capable of responding to changes in weather conditions. A change in outside weather is reflected in the temperature of the return air, and the thermal bulb or other means will react to change the dampers into positions adjusted to warm air temperature conditions in conformity with the new requirement. This condition is readily fulfilled by bringing the temperature of the air in the discharge chamber 9 up to the point to heat the space and to raise the return air temperature to a point where the thermal bulb again balances the system by shifting the dampers 37 and 38. Thereafter the temperature of the air in chamber 9 controls the demand.

The principle of operation of the controller is based upon the mixing of air from the warm air plenum with the air from the blower, and the blower air may be composed of return air or of a mixture of fresh air and return air. By positioning the thermostat adjacent the discharge point of the mixture of air coming from the mixing chamber of the manifold and which air has been originally bled from the warm air plenum and from the blower discharge duct, the air flow over the thermostat will react directly to the temperature of the mixed air and it is this particular reaction of the mixed air temperature upon the thermostat which is utilized for starting and stopping the burner, or stoker, or for modulating the atmospheric and temperature conditions of the forced hot air system to accommodate certain changes in the heating demands or conditions of such system.

To summarize, a controller designed and constructed along the lines shown and described can be utilized for carrying forward the basic principle of mixing air from the sources indicated and this principle permits the use of an instrument of simple construction which includes a single manifold with connecting conduits and dampers or butterfly valves to regulate the flow of air through the building ducts with the addition of other thermally sensitive means incorporated in conjunction with the return duct of a conventional heating system to pilot the operation of the control thermostat. Once the thermal means is adjusted for required space temperature, no further adjustment is required.

Experience from actual installations incorporating the controller of the present invention in a heating plant have shown that a change in the outside weather conditions or building occupancy is compensated for by a slight repositioning of the dampers in the manifold and that no noticeable change in the heated space is observed. On a test installation employing an on and off oil burner operation, the warm air plenum and discharge duct temperatures were found to vary only two degrees as long as load factors remained constant. Thermometers placed in heated spaces showed no variation over extended periods of operation. It is obvious that when the output of the heating equipment is kept in strict conformity with the requirements of the heated space, maximum economy is obtained. The comfort in the heated space is definitely maintained, since the volume of air introduced is constant and the deviations in temperature quite small. The controller of the present invention therefore fulfills a long sought need.

Changes and modifications in the exact form, construction, shape of the elements, and in the combination of mechanisms utilized are contemplated along with the substitution of equivalent means to carry out the functions of this invention. All such variations shall, however, be determined by the breadth and scope of the appended claims directed to the controller described and disclosed.

What I claim is:

1. A control device to regulate the temperature of the air discharged from a heating plant having space heating and return ducts connected therewith, comprising a manifold, air bleed tubes connected between said ducts and said manifold to introduce warm and cool air to mix in said manifold, damper mechanism comprising spaced dampers in said manifold to change the mixture ratio of warm and cool air entering said manifold, thermostatic means positioned for thermal contact with said manifold air mixture and having operative connection with said heating plant to run the latter when said mixed manifold air drops to a predetermined minimum temperature, and actuating mechanism connected with said damper mechanism to operate the latter, said actuating mechanism including thermal responsive means in said return duct to control the movements of said actuating mechanism.

2. A control device to regulate the temperature of the air discharged from a heating plant having space heating and return ducts connected therewith, comprising a manifold, air bleed tubes connected between said ducts and said manifold to introduce warm and cool air to mix in said manifold, damper mechanism comprising spaced dampers in said manifold to change the mixture ratio of warm and cool air entering said manifold, said manifold having a discharge port to expel the mixed air therefrom, thermostatic means disposed directly in the path of said expelled air and having operative connection with said heating plant to run the latter when said mixed manifold air drops to a predetermined minimum temperature, and actuating mechanism connected with said damper mechanism to operate the latter, said actuating mechanism including thermal responsive means in said return duct to control the movements of said actuating mechanism.

3. A control device to regulate the temperature of the air discharged from a heating plant having space heating and return ducts connected therewith and a blower interposed in the return duct to force cool air through said heater, comprising a manifold, a first air bleed tube connected with said space heating duct, a second air bleed tube connected with said return duct between the blower and heater, both of said tubes communicating with said manifold to introduce warm and cool air for mixing in said manifold, damper mechanism comprising spaced dampers in said manifold to change the mixture ratio of warm and cool air entering said manifold, thermostatic means positioned for thermal contact with said manifold air mixture and having operative connection with said heating plant to run the latter when said mixed manifold air drops to a predetermined minimum temperature, and actuating mechanism connected with said damper mechanism to operate the latter, said actuating mechanism including thermal responsive means in said return duct ahead of said blower to control the movements of said actuating mechanism, said thermostatic means being immediately responsive to cold fresh air admitted to said blower to turn on said heating plant.

4. A control device to regulate the temperature of the air discharged from a heating plant having space heating and return ducts connected therewith and a blower interposed in the return duct to force cool air through said heater, comprising a manifold, a first air bleed tube connected with said space heating duct, a second air bleed tube connected with said return duct between the blower and heater, both of said tubes communicating with said manifold to introduce warm and cool air for mixing in said manifold, damper mechanism comprising spaced dampers in said manifold to change the mixture ratio of warm and cool air entering said manifold, said manifold having a discharge port to expel the mixed air therefrom, thermostatic means disposed directly in the path of said expelled air and having operative connection with said heating plant to run the latter when said mixed manifold air drops to a predetermined minimum temperature, and actuating mechanism connected with said damper mechanism to operate the latter, said actuating mechanism including thermal responsive means in said return duct ahead of said blower to control the movements of said actuating mechanism, said thermostatic means being immediately responsive to cold fresh air admitted to said blower to turn on said heating plant.

5. A controller for forced air heating systems including a heater, warm and cool air ducts connected therewith, and a blower in said cool air duct, comprising a manifold adapted to mix warm and cool air samples from said ducts, a thermostat positioned for thermal contact with said manifold air mixture, flow control means comprising spaced dampers in said manifold to change the mixture ratio of said warm and cool air samples, and thermal responsive means in said cool air duct having operative mechanism connected to regulate said flow control means to drop the air mix temperature to actuate said thermostat, said thermostat having operative connection with said heater to run the same when actuated.

6. A controller for forced air heating system including a heater, warm and cool air ducts connected therewith, and a blower in said cool air duct, comprising a manifold adapted to mix warm and cool air samples from said ducts at the heater inlet and outlet points of said ducts, a thermostat positioned for thermal contact with said manifold air mixture, flow control means comprising spaced dampers in said manifold to change the mixture ratio of said warm and cool air samples, and thermal responsive means in said cool air duct disposed in advance of said blower and having operative mechanism connected to regulate said flow control means to drop the air mix temperature to actuate said thermostat, said thermostat having operative connection with said heater to run the same when actuated.

7. A controller for a forced air heating system including a heater, warm and cool air ducts connected therewith, and a blower in said cool air duct, comprising a manifold adapted to mix warm and cool air samples from said ducts at the heater inlet and outlet points of said ducts, a thermostat positioned for thermal contact with said manifold air mixture, flow control means comprising spaced dampers in said manifold to change the mixture ratio of said warm and cool air samples, and thermal responsive means disposed for thermal contact with the air discharged from the blower and entering said heater, said thermal responsive means having operative mechanism connected to regulate said flow control means to change the temperature of the air mix in said manifold, said thermostat having operative connection with said heater to run the latter when actuated by a drop in the temperature of said air mix in said manifold to a predetermined value.

8. A controller for forced air heating system including a heater, warm and cool air ducts connected therewith, and a blower in said cool air duct, comprising a manifold adapted to mix warm and cool air samples from said ducts at the heater inlet and outlet points of said ducts, a thermostat positioned for thermal contact with said manifold air mixture, flow control means comprising spaced dampers in said manifold to change the mixture ratio of said warm and cool air samples, and thermal responsive means arranged for thermal contact with the air entering the heater from said blower by bodily confining said means within the manifold adjacent the end receiving such air, said thermal responsive means having operative mechanism connected to regulate said flow control means to change the temperature of the air mix in said manifold, said thermostat having operative connection with said heater to run the latter when actuated by a drop in the temperature of said air mix in said manifold to a predetermined value.

9. A control device to regulate the temperature of air discharged from a heating plant having space heating and return ducts connected therewith comprising a manifold, air bleed tubes connecting said manifold with said ducts to introduce warm and cool air to mix in said manifold, spaced dampers in said manifold defining a mixing compartment therebetween, and regulating the amounts of warm and cool air in such compartment, thermostatic means responsive to the air in said mixing compartment and having operative connection with said heating plant for controlling the operation thereof and actuating mechanism connected to said dampers to operate the same and including thermal responsive means in said return duct to control the movements of said actuating mechanism.

10. Cooperative mechanisms to control and regulate the output temperature of the air from a forced air heating system having a heater, warm and cool air ducts connected therewith, and a blower interposed to continuously circulate the air through said heater when the system is in use, comprising an air intermingling and discharging manifold having air flow inlets connected with the warm air and cool air ducts at points adjacent the heater, flow control means for said inlets respectively, and a first thermal responsive means arranged for thermal contact with the manifold air mixture, a second thermal responsive means arranged for thermal contact and to react solely to temperature changes of the air in the cool air duct, and operative mechanism connecting said second thermal responsive means with the flow control means for said manifold inlets to proportionally regulate the air flow from the warm and cool air ducts into the manifold to balance the air flow in the heating system in accordance with the demand, said first thermal responsive means having operative connection with the heater to run the same at any time when the temperature drops below a predetermined minimum at the zones of thermal contact at either of the aforesaid thermal responsive means.

LLOYD E. CROSS.

REFERENCES CITED

The following references are of record in the file of this patent:

UNITED STATES PATENTS

| Number | Name | Date |
|---|---|---|
| 1,022,188 | Geissinger | Apr. 2, 1912 |
| 1,875,851 | Carson | Sept. 6, 1932 |
| 1,917,880 | Frantz | July 11, 1933 |
| 2,199,531 | Von Schutz | May 7, 1940 |
| 2,207,979 | Gauger | July 16, 1940 |
| 2,440,052 | Lingen | Apr. 20, 1948 |